April 20, 1926.  1,581,934
W. LARSEN
PROCESS FOR BLANCHING VEGETABLES
Filed August 24, 1922  4 Sheets-Sheet 1

Inventor
William Larsen, deceased, by
Austin C. Larsen, Milton W. Larsen and
Joseph H. Taylor, Executors.

Frank O. Parker
Att'y.

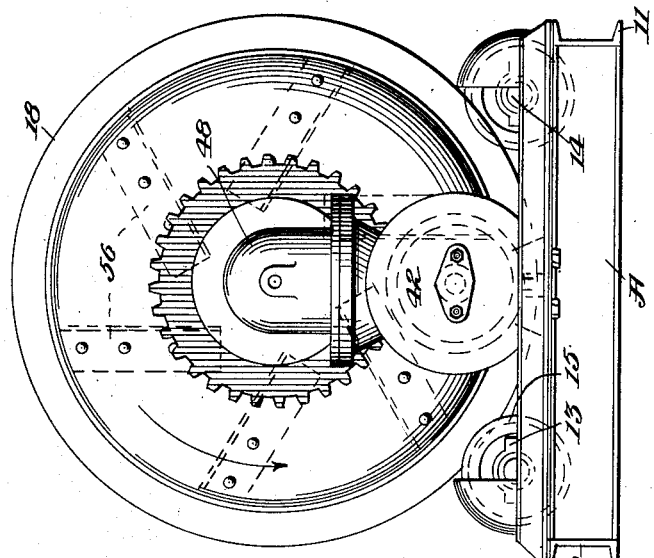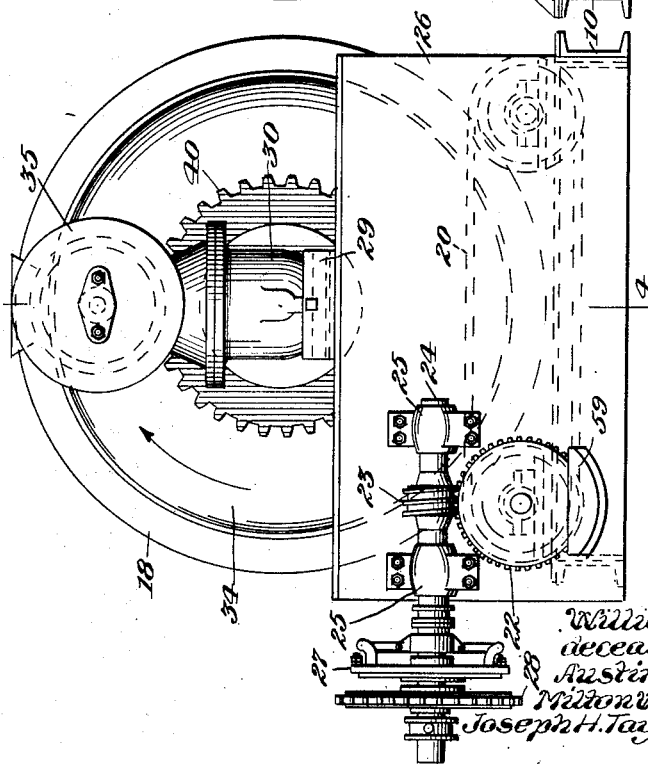

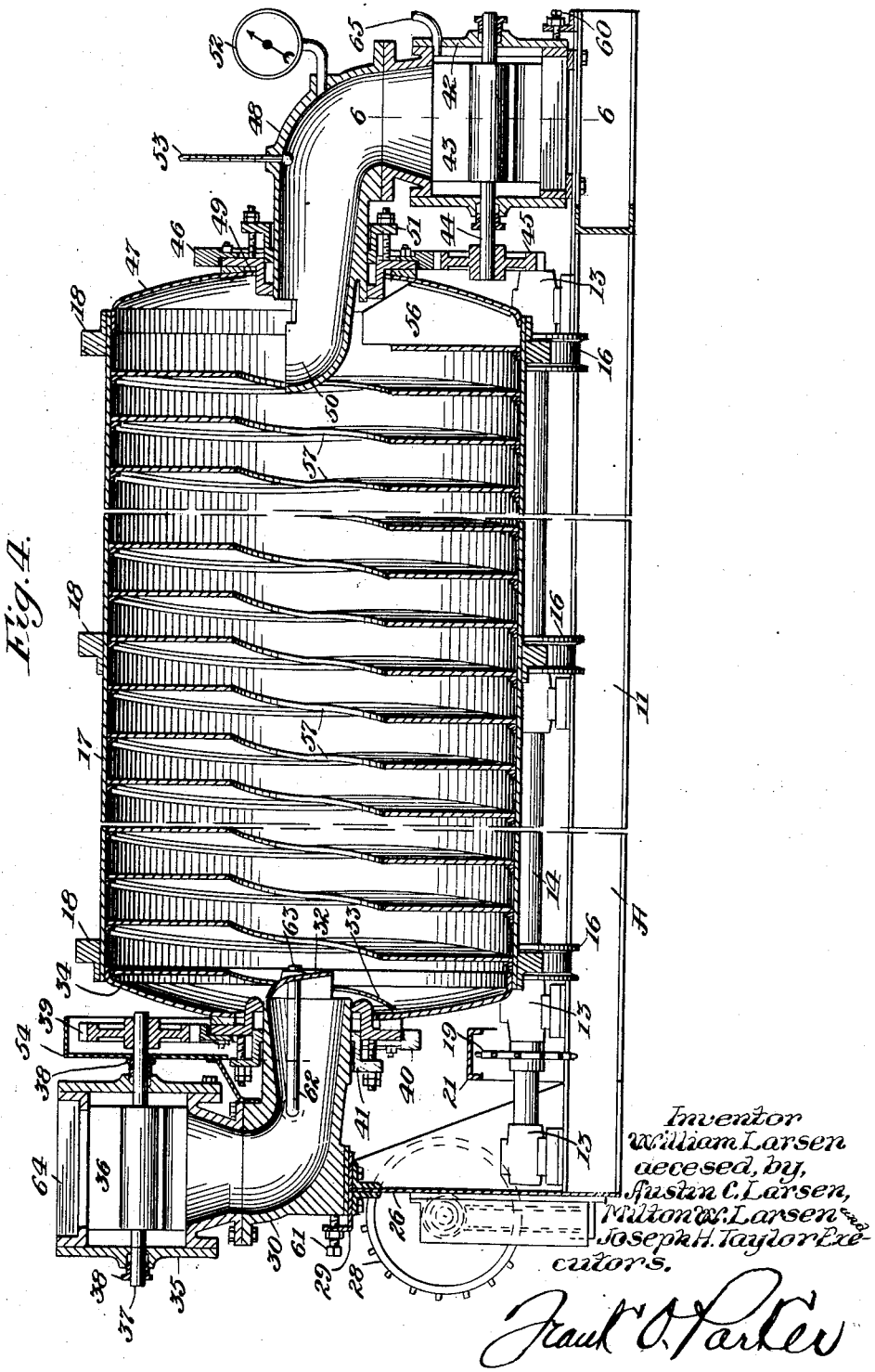

April 20, 1926.
W. LARSEN
1,581,934
PROCESS FOR BLANCHING VEGETABLES
Filed August 24, 1922    4 Sheets-Sheet 4
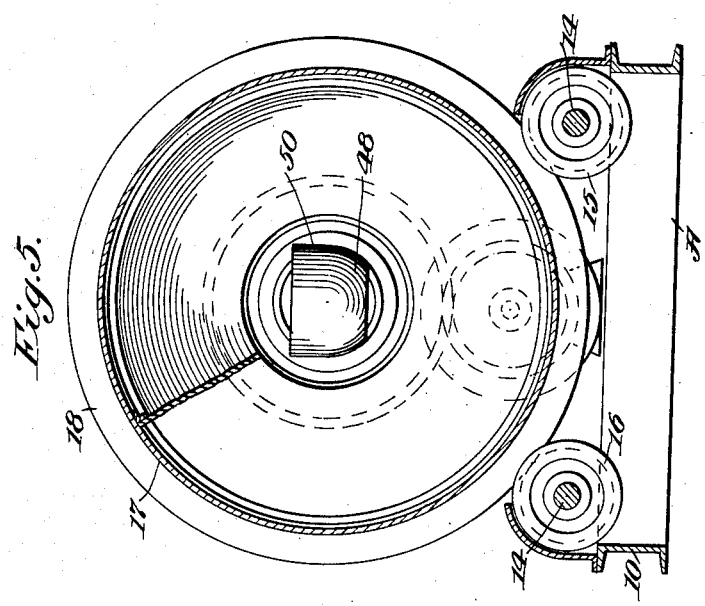
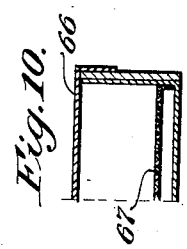
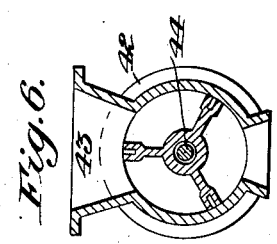
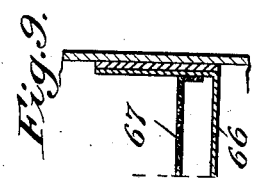
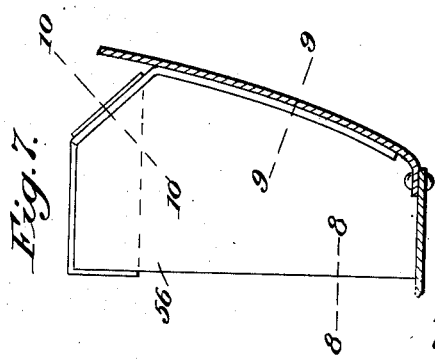
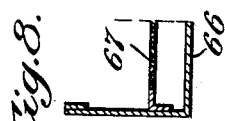
Inventor
William Larsen, deceased, by
Austin C. Larsen, Milton W. Larsen
and Joseph H. Taylor, Executors.
Frank O. Parker
Atty.

Patented Apr. 20, 1926.

1,581,934

UNITED STATES PATENT OFFICE.

WILLIAM LARSEN, DECEASED, LATE OF GREEN BAY, WISCONSIN; BY AUSTIN C. LARSEN, MILTON W. LARSEN, AND JOSEPH H. TAYLER, EXECUTORS, ALL OF GREEN BAY, WISCONSIN.

PROCESS FOR BLANCHING VEGETABLES.

Application filed August 24, 1922. Serial No. 584,014.

*To all whom it may concern:*

Be it known that WILLIAM LARSEN, deceased, late a citizen of the United States, residing at Green Bay, in the county of Brown and State of Wisconsin, has invented certain new and useful Improvements in Processes for Blanching Vegetables, of which the following is a specification.

The invention relates to a process of blanching or cooking vegetables such as peas, beans for baked beans, string beans, etc. This blanching or cooking is an essential step in the preparation of such vegetables for canning. In canneries where such cooking or blanching takes place on a large scale great difficulty has been experienced in obtaining blanching results with sufficient capacity and effective cooking and at the same time not contaminating the vegetables.

As now practised such contamination invariably takes place for the reason that the hot water in which the vegetables are cooked or blanched becomes foul with the juices and loose detritus of the vegetables. The vegetables in cooking swell and absorb a certain percentage of the water in which they are cooked. If this water is in any respect foul it will enter the body of the vegetables and contaminate them and materially degrade the flavor and quality of the product. In canning peas it has long been customary to attempt to overcome the ill effect of this bad flavor by the use of sugar. This results in the canned product having an entirely different flavor from the natural flavor and in its being not only less palatable but much less wholesome. It is also true that the methods heretofore employed wherein quantities of the product in succession are passed through the same large body of water, have limited the capacity and produced inefficient cooking for the reason that nothing but water has been used in the cooking, which never could be at a higher temperature than the boiling temperature, and for this reason the time required to effect complete and satisfactory cooking is much longer than is necessary with the apparatus, and consequently the amount of vegetables that can be improperly cooked in a given time will be less. Furthermore, by the use of confined live steam under pressure directly upon the vegetables as they travel through the apparatus one is not only enabled to cook the vegetables in less time than by the strictly boiling process, but effect a cooking action which is superior in its results on the product to that which may be obtained by the use of boiling water alone or not under confined live steam pressure.

It is the object of the invention to effect a series of steps or acts coacting to effect a cooking operation on vegetables which at the same time will overcome the objections and accomplish the desirable results above enumerated.

Another object of the invention is to develop a process of cooking vegetables which on the one hand will have large capacity in continuous operation sufficient to be practicably effective in the larger canning operations, and at the same time by the use of confined steam under pressure directly upon the vegetables or upon the vegetables into it and in relation to the time required for such vegetables to be cooked, to accomplish such cooking in a relatively shortened time and thereby to increase the productive capacity of any apparatus employed for carrying out my process, to effect a more perfect cooking so that the quality of the resultant product is improved by the cooking action itself, and to maintain the water in vegetables as they are cooked clean and pure so that the vegetables absorb nothing but clean and pure water, and hence are not contaminated, the entire process tending to cause the vegetables to retain the natural palatable flavor of the vegetables.

More specifically, the invention consists in spreading the vegetables in any desired quantity and moving them continuously in that mass subject to the action of confined steam at variable high pressure upon the vegetables, and preferably in a moving stream of hot water forming a relatively extended and shallow body, and maintaining the movement of said water and the temperature at or above the boiling point while in movement, within a cooking chamber, by adding boiling water at one end of said stream and discharging it at the other end at a rate proportional to the amount of vegetables in and passing through said stream of water, and proportional to the total time which said vegetables must be in said water to be properly cooked, and subjecting the water and the vegetables to the action of confined live steam from a source of steam under pressure, which pressure is regulated to effect the most efficient cooking action in a minimum period of time; and of introducing said vegetables at one end of the stream of water, and agitating the vegetables of the mass and moving them along and in said stream, subject the entire body in the said stream to the action of such confined pressure steam, at such a rate that they will reach the end of the stream in a predetermined time just sufficient properly to cook the vegetables, and thereafter withdrawing the vegetables from the mass and from the stream of water at the other end thereof and at the end of said period.

The full objects and advantages of the invention will appear in connection with the detailed description thereof, and the novel features embodied in the inventive idea will be particularly pointed out in the claims.

In the drawings appended, which illustrates certain forms of apparatus for practising the various steps of the process:

Figure 2, is one end elevation.

Figure 3, is another end elevation.

Figure 4, is a longitudinal sectional elevation through the machine.

Figure 5, is a sectional view on the line 5—5 of Figure 1 looking in the direction of the arrow.

Figure 6, is a fragmentary vertical transverse view of the hopper and inlet valve.

Figure 7, is a fragmentary detailed sectional view through one of the buckets.

Figure 8, is a sectional view on the line 8—8 of Figure 7.

Figure 9, is a sectional view on the line 9—9 of Figure 7.

Figure 10, is a sectional view on the line 10—10 of Figure 7.

Similar reference characters indicate corresponding parts throughout the several views in the drawings:

Figure 1:
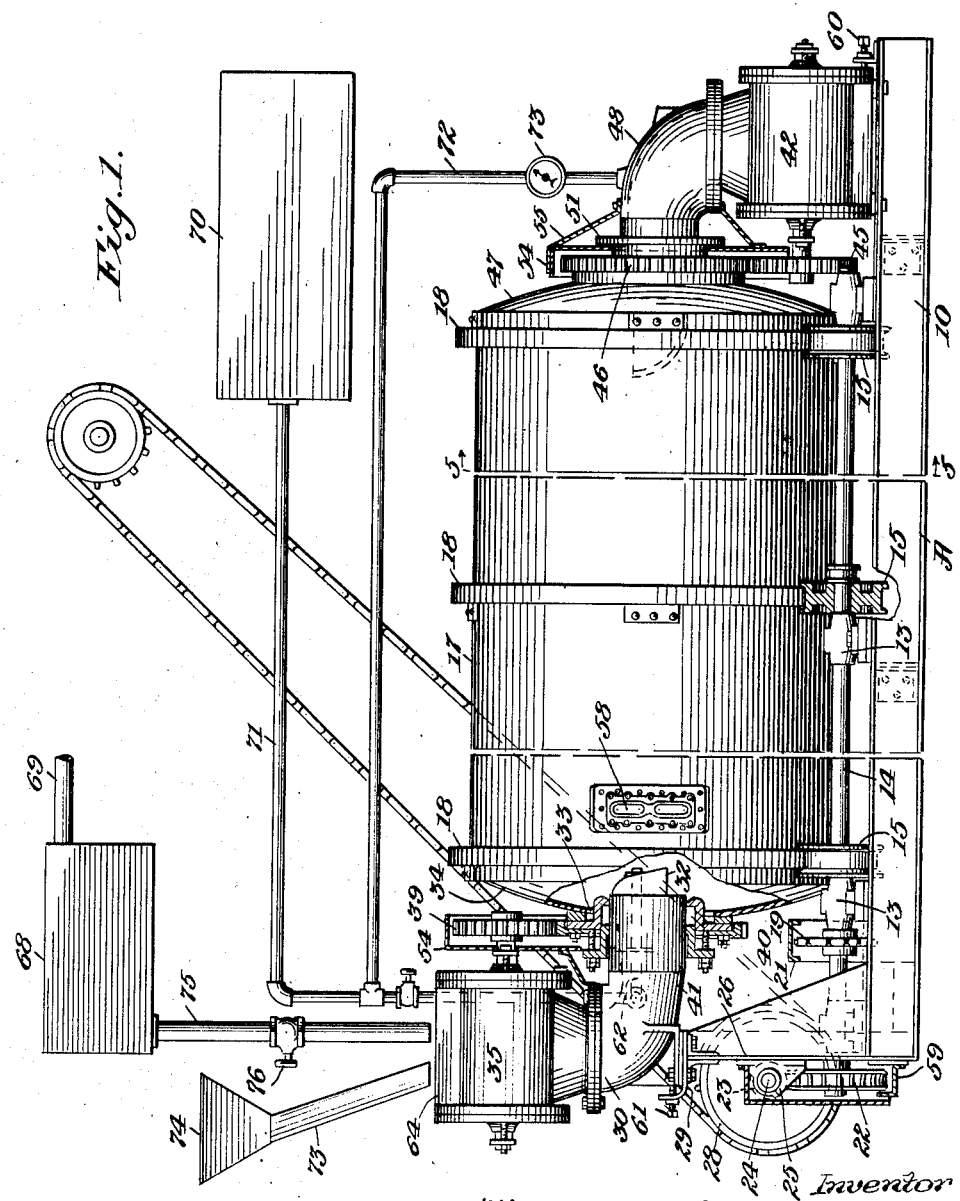
Figure 1, is a side elevation part sectional view of one form of apparatus with some parts represented diagrammatically for carrying out various steps of the process.

Referring to the drawings in detail, the machine comprises a base frame A, including longitudinal and transverse sills or beams 10, and 11, respectively, the same being united to each other in any suitable manner. Mounted upon suitable supports in the form of blocks 12, arranged at intervals lengthwise of the base frame A, on opposite sides thereof, are bearings 13, in which are journaled driven shafts 14, having keyed or splined thereto intermediate and outer peripherally grooved rollers 15, and 16 respectively, for movably supporting a container in the form of a closed or air-tight cylindrical drum 17, provided with external bands or flanges 18, to be received in the grooves in said rollers, to prevent longitudinal displacement of the drum when being rotated. The bands or flanges 18, are bolted or otherwise secured in place upon the drum 17.

Secured to the shafts 14, are sprocket wheels 19, over which is trained an endless sprocket chain 20, so that motion from one shaft will be imparted to the other, and these shafts will rotate in the same direction in unison, the sprocket wheels 19, being preferably located at the fore end of the machine.

The sprocket wheels and chain have over the same a guard 21, which is of an approved form. On one of the shafts 14, at the fore end of the machine is a worm gear 22, which meshes with a worm screw pinion 23, on a stub shaft 24, mounted in bearings 25, fixed to a riser 26, upon the base frame A.

The shaft 24, carries a clutch 27, which is adapted to be manually operated and is designed to control a drive pulley or sprocket gear 28, which is loosely mounted upon said shaft 24, and is made fast thereto by the clutch when actuated, the motive power for the machine being connected with the sprocket gear 28, and may be of any conventional type.

Medially of the riser 26, is a chair 29, upon which is adjustably mounted an inlet casting or nozzle 30, through which is admitted the vegetables to be cooked in the drum 17, the mouth 31, of the casting or nozzle 30, being fitted with a downwardly directed baffle 32, the nozzle or casting and baffle being extended through a center opening 33, formed in the forward head 34, of the drum 17, while carried at the other end of the inlet casting 30, is a cylindrical valve casing 35, having therein a multiple bladed rotary valve 36, of the Corliss type, the stem 37, thereof being journaled in the ends of the valve casing 35, and these ends are provided with packing glands 38, about the stem.

On one end of the stem 37, is a gear 39, meshing with a companion gear 40, secured to the head 34, of the drum 17, while about the center opening 33, in said head is a stem and water tight gland 41, which surrounds the casting or nozzle 30, to prevent any leakage between it and the head during the rotation of the drum, when the machine is operating.

At the discharge end of the drum 17, is arranged a discharge valve casing 42, having therein a multiple bladed rotary valve 43, of the Corliss type, corresponding to the valve 36, the stem 44, of said valve 43, being journaled in the ends of the casing 42, and carries at one end a gear 45, meshing with a companion gear 46, fitted on the head 47, at the discharge end of the drum 17, the valve casing 42, being connected with a discharge nozzle 48, extending into the drum 17, through a center opening 49, in the head 47, the mouth 50, of the nozzle 48, being designed to open upwardly in the drum for receiving the vegetables therein. About the opening 49, is a steam and water tight gland 51, corresponding to the other gland 41, heretofore mentioned.

The nozzle 48, is provided with a pressure gauge 52, and a temperature controlling device 53, of any conventional type. The gears 39—40 and 45—46, are encased with a guard 54 and 55, respectively, which are supported in any suitable manner.

On the inner face of the head 47, riveted or otherwise secured thereto are buckets 56, which are arranged tangentially relative to the center opening 49, in said head, so as to trap the vegetables and a portion of the water contained in the drum 17 and deliver the same through the center opening 49, where a discharge will be effected through the discharge nozzle 48, into the valve casing 42, and thence therefrom exteriorly of the machine.

Within the drum 17, is a spiral 57, forming a conveyer for the vegetables within the said drum, this spiral being secured to the cylindrical wall of the latter and to the head 34, at one end, while the other end of the spiral is designed to terminate between one or more of the buckets 56, one of the latter being flanged for the riveting or otherwise securing of the spiral thereto.

On the drum 17, is mounted a water glass 58, of any ordinary construction, so that it may determine the level of the water in said drum.

The worm gear 22, works in an oil pan 59, mounted upon the base frame A, so that it can be properly lubricated in the operation of the machine.

The valve casing 42, is adjustably mounted upon the base frame A, and is held in place by a set screw 60, and likewise the inlet casting 30, is held in place by a set screw 61, engaged in the chair 29, on the riser 26, upon the base frame.

Extending through the inlet nozzle 30, is a steam pipe 62, having an ejector 63, so as to cause a suction in the drum 17, to maintain a constant level of water in the latter, while the steam admitted through the pipe into the said drum 17 and confined within the latter, will effect the lbs. pressure per inch therein.

On the upper side of the valve casing 35, is a hopper 64, into which is introduced the peas or other vegetables and water. The spiral 57, in the drum 17, forms a continuous passageway and operates at the bottom of said drum to forward vegetables and water along said bottom as the vegetables are fed into the drum from the inlet nozzle 30, at the feed end of the machine.

In general, it is preferable to employ water, which will be fed into the drum 17, at a rate proportional to the feed of vegetables into the drum and the rate of rotation thereof and the discharge of vegetables and water from said drum.

It will be understood that the drum 17, is caused to rotate quite slowly so that without excessive length the vegetables may be caused to travel at the bottom of the said drum at a rate sufficiently so that the time which elapses from the entrance of said vegetables into the water to their discharge from the buckets will be long enough to effect the desired cooking and no longer. The admission of the water and the discharge thereof to and from the drum 17, is regulated so as to maintain a constant determined level of water over the bottom of said drum for the vegetables to pass therethrough in the cooking.

In Figures 7, 8, 9, and 10, of the drawings, there are shown certain details of construction of the specific form of each bucket 56, connected at the end 47, of the drum 17, of the apparatus. Each bucket 56, is formed with a water pan 66, and a screen 67 therein.

By reference to Figure 4, of the drawings, it will be seen that leading through the end cap of the outlet valve 42, is a pipe 65, whereby cool water is admitted into the discharge end of the apparatus, so as to cool the contents as the same will be delivered from said apparatus.

A hot water tank 68, receives water from any suitable source of supply through a pipe 69, the amount of water in the tank being controlled in any manner.

This water is heated to boiling by steam from a boiler indicated diagrammatically at 70, which passes from said boiler through a main feed pipe 71, connected with the pipe 62. Leading from the main feed pipe 71, is the branch pipe 72, which is connected with the discharge nozzle 48.

Leading to the hopper 64, is a chute 73, communicating with a vegetable storage bin 74, so that the vegetables may be delivered to the hopper from said bin. Also directed toward this hopper 64, is a pipe 75, leading from the hot water tank 68. It is of course, understood that in lieu of hot water in this tank, cold water can be supplied thereto or liquid syrup. The pipe 75, is provided with a hand operable valve 76, to regulate the flow of liquid therethrough.

What is claimed is:

1. The process of cooking vegetables or the like for canning, which consists in causing a body of hot water to move progressively through a substantially fluid tight casing so that the entire extent of said water will pass from one end thereof to the other end in a predetermined time, introducing hot water at one end and discharging it from the other end of said body of water to maintain the same constant, introducing steam under pressure above said body of water to uniformly contact the entire surface thereof and maintaining said encased steam at a pressure and the boiling point of said water above normal, introducing vegetables into said body at or near the point where the hot water is introduced in amount proportional to the amount of hot water so introduced, and moving said vegetables with the body of hot water and discharging the vegetables with the hot water, said period of time from the introduction of vegetables and hot water to the discharge thereof being just sufficient to properly cook the vegetables.

2. The process of cooking vegetables and the like for canning, which consists in providing an extended closed and substantially fluid tight cooking chamber having a relatively extended body of hot water therein, introducing hot water at one end and discharging it at the other end of said body at a rate such that the body of water will be entirely changed in a predetermined period of time, injecting live steam under pressure into said chamber and maintaining said steam pressure above normal to maintain the boiling point of said body of water above normal, introducing vegetables into the body of water at one end, causing the vegetables to move in and to the other end of said body of water in the same period of time in which change of the body of water is effected, and separating said vegetables from the body of water and discharging them from the other end of the chamber at the end of said period.

In testimony whereof, we affix our signatures.

AUSTIN C. LARSEN.
MILTON W. LARSEN.
JOSEPH H. TAYLER.
*Executors of the Estate of William Larsen, Deceased.*